United States Patent [19]
Kalis

[11] Patent Number: 6,095,470
[45] Date of Patent: Aug. 1, 2000

[54] EJECTING ELECTRONIC INSTRUMENT MOUNT

[75] Inventor: Robert M. Kalis, Overland Park, Kans.

[73] Assignee: Garmin Corporation, Taiwan

[21] Appl. No.: 09/235,948

[22] Filed: Jan. 22, 1999

[51] Int. Cl.[7] .................................................. A47F 5/00
[52] U.S. Cl. ...................................... 248/309.1; 379/455
[58] Field of Search ................................. 379/454, 455; 248/309.1, 316.4, 316.5, 316.1, 316.3, 313

[56] References Cited

U.S. PATENT DOCUMENTS

| | | | |
|---|---|---|---|
| D. 390,849 | 2/1998 | Ritcher et al. | D14/253 |
| 5,033,709 | 7/1991 | Yuen | 248/313 |
| 5,179,590 | 1/1993 | Wang | 379/454 |
| 5,187,744 | 2/1993 | Ritcher | 379/449 |
| 5,305,381 | 4/1994 | Wang et al. | 379/455 |
| 5,480,115 | 1/1996 | Haltof | 248/221.11 |
| 5,788,202 | 8/1998 | Richter | 248/316.4 |
| 5,792,994 | 8/1998 | Akahane | 174/138 |
| 5,825,874 | 10/1998 | Humphreys et al. | 379/446 |

*Primary Examiner*—Ramon O. Ramirez
*Attorney, Agent, or Firm*—Shook, Hardy & Bacon L.L.P.

[57] ABSTRACT

A mounting device for removably attaching a hand-held electronic instrument to a support surface includes a base adapted to be attached to the support surface. The base has a front surface for engaging the hand-held instrument. A pair of locking arms are attached to the base at laterally spaced locations. Each arm extends generally outwardly from the front surface and has a detent and a finger-engaging area associated therewith. The detents are capable of engaging the hand-held instrument to attach the instrument to the base. The arms have a first position wherein the detents engage the instrument. The arms also have a second position wherein the detents are disengaged from the instrument by an operator actuating the finger-engaging areas.

17 Claims, 2 Drawing Sheets

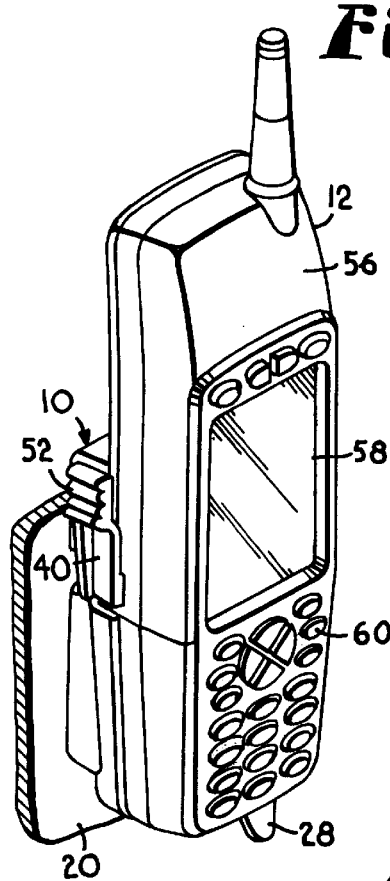
Fig.1.
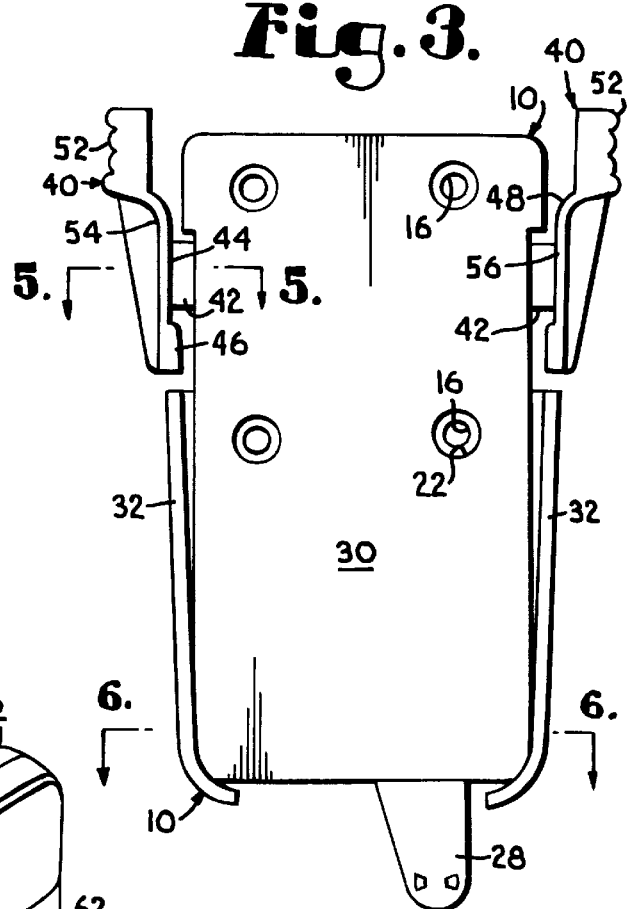
Fig.3.
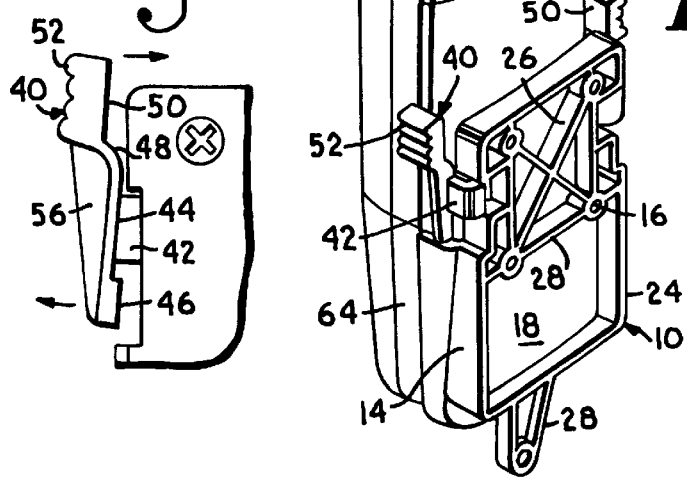
Fig.2.
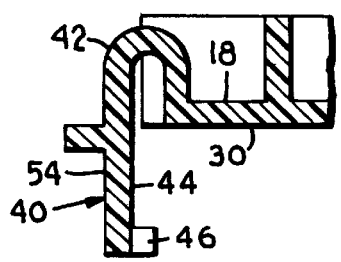
Fig.4.
Fig.5.

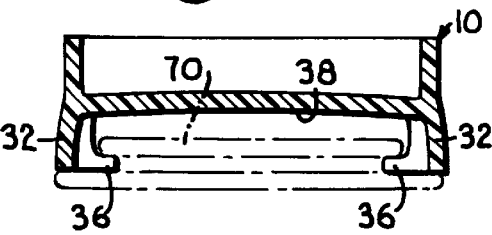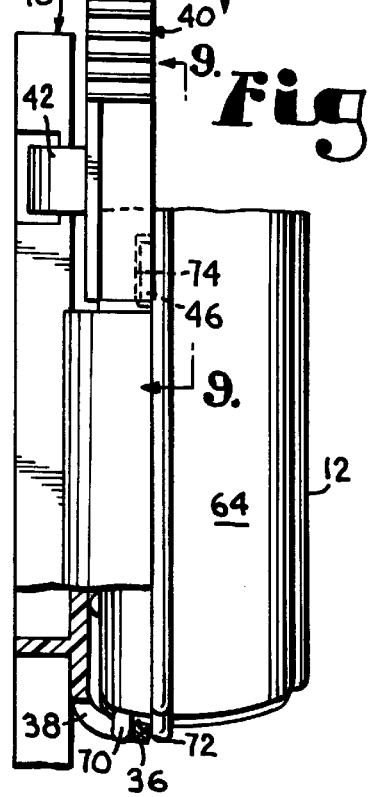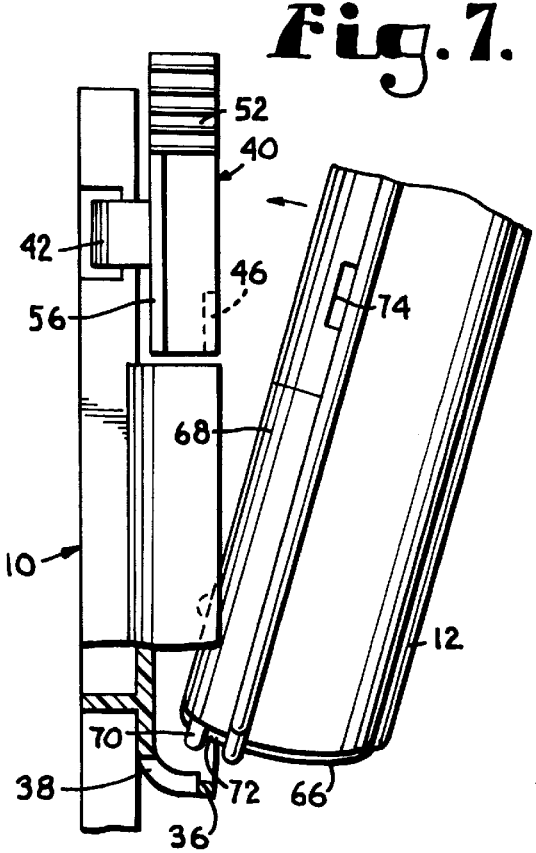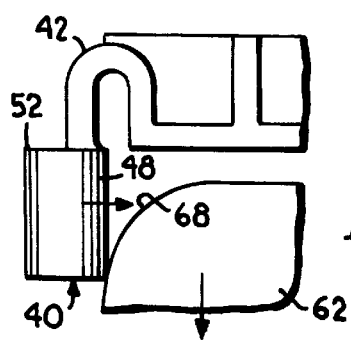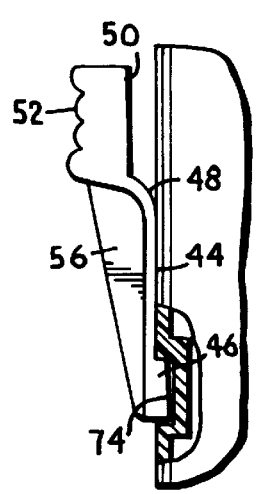

EJECTING ELECTRONIC INSTRUMENT MOUNT

FIELD OF THE INVENTION

This invention relates to a device for mounting an electronic instrument to a support surface, and, more particularly, to a device that allows easy attachment and detachment of the electronic instrument from the support surface.

BACKGROUND OF THE INVENTION

Hand-held electronic instruments have become increasingly popular in recent years. Such hand-held instruments include cellular phones, hand-held electronic organizers, and also handheld global positioning system (GPS) devices. It is often very desirable to allow a person to mount a hand-held instrument to a particular support surface, such as a vehicle dashboard or other surface in the passenger compartment of a vehicle. Because it is advantageous to operate the electronic instrument when it is attached to the support surface, such a mount needs to be firm and stable to allow a user to operate buttons on the electronic instrument, and also to read various displays, such as LCD panels, on the instrument.

Various devices have been developed for holding a cellular phone in a vehicle. Most of these devices include stationary gripping members used in conjunction with movable gripping members. In order to secure a phone to the holding device, a phone operator must insert the phone within the mounting base and thereafter in some manner actuate the movable gripping members toward the phone to pinch the phone such that it is attached to the mounting base. As is apparent, these structures offer various disadvantages For instance, such structures oftentimes require two hands to force the movable gripping members toward the stationary gripping members to secure the phone in the base. Examples of these types of phone mounts are found in U.S. Pat. No. 5,788,202 to Richter; U.S. Pat. No. 5,179,590 to Wang; and U.S. Pat. No. 5,033,709 to Yuen. In addition, these prior art devices also suffer from the disadvantage of having assembled moving parts, which can lead to expensive manufacturing costs and procedures. Still further, to dismount a phone from these mounting devices, it is often necessary to utilize two hands to actuate the movable gripping members away from the stationary gripping members. As is apparent, such an action can take a substantial amount of time on the part of the user, and also can require the user to utilize two hands in a driving situation, thus potentially creating an unsafe driving scenario.

Another example of a phone mount is found in U.S. Pat. No. 5,187,744 to Richter. This phone mount utilizes pivotally attached members to secure the phone in position on the mount. The construction of the mounting device in this reference includes numerous moving parts and various springs, thus likely leading to expensive manufacturing costs, and the potential for parts wearing out or breaking due to continued use. Additionally, this mounting device also may require an instrument operator to exercise a substantial amount of force to remove the telephone from the mount due to the spring-loaded action of the pivotally mounted gripping members. The force required could result in an operator being distracted during the operation of a vehicle in which the mount is disposed.

An additional mounting structure for an instrument is disclosed in U.S. Pat. No. 5,480,115 to Haltof. This reference discloses a holding device that has a cradle portion adjacent a lower end of the instrument and a latch member on the top of the instrument. As is apparent, the location of the latch member on the top of the instrument is not located conveniently for actuation by a user attempting to grab the instrument from the holder. In particular, a user typically grabs an instrument utilizing the thumb on one side and one or more of the other fingers on the other side. Therefore, the positioning of the latch on the top of the electronic instrument does not lead to an ergonomic design that would allow an operator to grip the instrument in a normal position, and at the same time operate the structure used to latch the instrument in place. Additionally, this reference has at least two moving parts and could be difficult to assemble, requiring the snapping in of a pivot point arrangement adjacent the upper surface of the mount.

A holding device is needed to alleviate the problems discussed above with the prior art structures. In particular, a holding device is needed that securely holds an electronic instrument in place, while allowing easy one-handed attachment and detachment of the electronic instrument from the holding device. Additionally, a mount is needed that can be easily manufactured with a minimum number of pieces to provide a durable, simple manner of attachment of an electronic instrument to a support surface.

SUMMARY OF THE INVENTION

Accordingly, it is an object of the present invention to provide a holding device for an electronic instrument that allows easy attachment and detachment of the instrument to a support surface.

Another object of this invention is to provide a holding device that allows an electronic instrument operator to attach and detach the instrument to a support surface utilizing a single hand, and in such a manner that is ergonomically desirable for the instrument user.

A further object of the present invention is to provide a holding device that minimizes the number of separate parts, and is easy to construct and maintain.

A still further object of the present invention is to provide a holding device that ejects the electronic instrument into the hand of an electronic instrument user during the detaching of the instrument from the mounting device.

Accordingly, the present invention provides for a holding device for removably attaching a hand-held electronic instrument to a support surface. The holding device includes a base adapted to be attached to the support surface. The base has a front surface for engaging the handheld instrument. A pair of locking arms are provided and are attached to the base at laterally spaced locations. Each arm extends generally outwardly from the front surface of the base and has a detent and a finger-engaging area associated therewith. The detents are capable of engaging the hand-held instrument to attach the instrument to the base. The arms have a first position wherein the detents engage the instrument. The arms also have a second position wherein the detents are disengaged from the instrument by an operator actuating the finger-engaging areas.

The invention further includes the arms of the device described above having camming members located adjacent the finger-engaging areas. The camming members engage the back portion of the electronic instrument when the finger-engaging areas are actuated to force the instrument away from the base.

The invention further includes a receiving slot formed adjacent the lower end of the base and adapted to receive a projection extending from a lower end of the electronic instrument.

The invention also includes the locking arms attached to the base through torsion members positioned at intermediate locations along the arms.

Still further, the present invention provides for a method of mounting a hand-held instrument to a support surface. The method includes the mounting of a base to the support surface.

The base has a pair of laterally spaced detents and a receiving slot disposed adjacent the lower end of the base. The method further includes inserting a projection formed on the bottom of the instrument into the slot of the base with the instrument at an angle to the base. The method additionally includes the rotation of the instrument toward the base with the projection still in the slot. The method then provides for the snapping of the detents into apertures formed on the instrument to secure the instrument to the base.

Additional objects, advantages and novel features of the invention will be set forth in part in the description that follows, and in part will become apparent to those skilled in the art upon examination of the following, or may be learned by practice of the invention.

BRIEF DESCRIPTION OF THE DRAWINGS

In the accompanying drawings that form a part of this specification and are to be read in conjunction therewith and in which like reference numerals are used to indicate like parts in the various views:

FIG. 1 is an upper front perspective view of a mounting device attached to a support surface and holding a cellular phone/GPS electronic instrument in a firmly secured position;

FIG. 2 is an upper back perspective view of the mounting device of FIG. 1 detached from the support surface, with the electronic instruments still securely positioned in the mounting device;

FIG. 3 is a front elevational view of the mounting device shown in FIG. 1 with the electronic instrument removed from the mounting device;

FIG. 4 is an enlarged elevational view of one of the locking arms shown in FIG. 3, the arm shown in its disengaged rotational position as indicated by the arrows;

FIG. 5 is a cross-sectional view taken generally along line 5—5 of FIG. 3;

FIG. 6 is a cross-sectional view taken generally along line 6—6 of FIG. 5 and showing the receiving slot of the mounting device, and further showing the projection attached to the lower end of the electronic instrument in phantom, and positioned in the receiving slot;

FIG. 7 is a side elevational view of the mounting device shown in FIG. 1, parts being broken away and shown in cross section to reveal details of construction, and showing the initial positioning of the projection of the electronic instrument in the lower slot of the mounting device;

FIG. 8 is a view similar to FIG. 7, but showing the electronic instrument in its attached engaged position with the detent of the locking arm engaging the aperture in the electronic instrument (as shown in phantom), and the projection of the electronic instrument engaging the slot of the mounting device;

FIG. 9 is an enlarged partial cross-sectional view taken generally along line 9—9, parts being broken away and shown in cross section to reveal details of construction, and showing the detent of the locking arm engaging the locking aperture of the electronic instrument; and FIG. 10 is a cross-sectional view taken generally along line 10—10 of FIG. 8, and showing the engagement of the curved back surface of the electronic instrument by the interior camming surface of the locking arm, such as indicated by the arrows demonstrating that inward pressure on the finger-engaging surfaces of the locking arm result in an outward force on the electronic instrument.

DETAILED DESCRIPTION OF THE PREFERRED EMBODIMENTS

Referring to the drawings in greater detail and initially to FIGS. 1—3, a device designated generally by the numeral 10 for mounting a cellular phone or global positioning system (GPS) device 12 is shown. Device 10 has a base 14 which is generally rectangular in nature and which has a plurality of mounting holes 16 for securing a rear surface 18 of base 14 to a support surface 20 such as a vehicle dashboard. Each hole 16 has a circular recessed area 22 which can receive the head of a mounting screw (not shown). Rear surface 18 has a supporting peripheral rib 24 extending rearwardly therefrom. Rib 24 is the portion of surface 18 which engages support surface 20 and is used to add rigidity to base 14. Additionally, diagonal ribs 26 and intermediate support rib 28 can also be used to add rigidity and support to base 14. Extending from a lower end of base 14 is an extension 28. Extension 28 has a magnet (not shown) disposed therein. Magnet 30 can be utilized to disengage a "reed" switch in a connector assembly (not shown) attached to phone 12.

Base 14 has a front supporting surface 30 which engages phone 12, as will be more fully described below. Extending upwardly from the edges of front surface 30 are a pair of oppositely positioned cradling lips 32. Lips 32 only extend to an intermediate location along each edge of base 12.

As best shown in FIG. 6, each lip 32 has a hook member 36 extending inwardly toward the interior of base 14. Hook members 36 in combination with one another form a receiving slot 38 that extends transversely across base 14. Slot 38 is closed along a rear surface, closed along its sides, and generally open along a front area except for the extension of hook members 36 inwardly. Hook members 36 contour inwardly from lips 32 to conform to phone 12.

With reference to FIGS. 3–5, base 14 further includes a pair of locking arms 40 secured thereto via torsion members 42. With reference to FIG. 5, torsion members 42 have a general "U" shape and are connected adjacent rear surface 18 and extend upwardly above front surface 30. Torsion members 42 allow general rotation of arms 40 thereabout during attaching and detaching a phone 12, as will be further described below. The "U" shape of torsion members 42 increases the longitudinal extent of the torsion member to such a degree to allow the desired rotational characteristics of the arm.

Torsion members 42 are attached at an intermediate location along their respective arm 40. Arms 40 are at spaced opposite lateral locations on base 14, and are generally rectangular in shape, as best shown in FIGS. 7–8.

Each arm 40 extends generally perpendicular to front surface 30, and extends longitudinally along base 14 adjacent a side edge thereof. Each arm 40 also has an inner surface 44 which has extending therefrom a detent 46. Detent 46 is used to engage phone 12 to secure the phone to device 10, as will be more fully described below. Interior surface 44 of each arm 40 has a curved camming surface area 48 formed just above the location of attachment of torsion member 42. It is camming surface 48 which engages phone 12 to eject it from device 10, again as will be more fully described below. Inner surface 44 has an offset area 50 which is directly opposite a finger-engaging area 52 formed on an outer surface 54 of arm 40. Area 52 is ribbed for engagement of the fingers of an electronic instrument user. Arms 40 can also have a support rib 56 to add rigidity thereto.

As indicated by the arrows in FIG. 4, each arm 40 is capable of rotation about its attached torsion member 42. More specifically, inward pressure on finger-engaging areas 52 result in torsion members 42 being put into a torqued orientation such that detents 46 are rotated away from one another, and camming surfaces 48 are rotated toward one another. Once pressure is released from finger-engaging areas 52, the resiliency of torsion members 42 results in arms 40 returning to their original position shown in FIG. 3.

It is preferable to form device 10 of a one-piece plastic construction which can be easily molded utilizing a simple two-half cavity/core mold. In particular, the simple structures of base 14, lips 32, arms 40, and torsion members 42 can all be formed integrally together out of a suitable plastic material. The plastic material utilized to mold entire device 10 can be of a suitable resilient nature so as to allow the torquing in members 42 and the return bias of arms 40 to their original positions when pressure is released from finger-engaging areas 52.

Phone 12 has an outer case 56 which includes a front-mounted display area 58 and a front-mounted keypad 60. Display 58 and keypad 60 need to be accessible to a phone user when phone 12 is secured to mounting device 10. Case 56 further includes a generally planar rear surface 62 which engages and conforms with front surface 30 of base 14 when phone 12 is attached to device 10. Rear surface 62 transitions to side members 64 and bottom surface 66 through a generally curvilinear area 68. When phone 12 is attached to device 10, lips 32 cradle sides 64 of case 56. Additionally, phone 12 has an extension member 70 located along its bottom surface and adjacent rear surface 62. Extension 70 is received in slot 38 when phone 12 is attached to device 10, as best shown in FIG. 6. Additionally, the open nature of slot 38 between hooks 36 allows a connector to be attached to phone 12 via electrical connecting area 72, as best shown in FIG. 7. Still further, when phone 12 is in its secured position in device 10, detents 46 are received in their respective elongated slots 74 formed in the respective side members 64 of case 56, as best shown in FIGS. 8–9. Thus, phone 12 is firmly attached to device 10 via the cradling of side surfaces 64 in lips 32, the positioning of extension 70 in slot 38, and the positioning of detents 46 in slots 74. Additionally, in this attached arrangement, inner surfaces 44 of arms 40 engage side surfaces 64 of case 56 to further add support to phone 12, as best shown in FIG. 9.

With reference to FIG. 7, in order to orient phone 12 in its mounted position, a user first angles the bottom portion of phone 12 toward base 14 and positions extension 70 in slot 38 with the phone at such an angle. Thereafter, phone 12 is hinged toward base 14 about extension 70 until such time as detents 46 engage slots 74. More specifically, curved areas 68 of rear surface 62 act as camming members to force outwardly detents 46 as the areas engage the detents. This outward movement is allowed by the torsional nature of members 42. As detents 46 are forced outwardly, they eventually come into alignment with slots 74, after which time they "snap" into place, thus securing phone 12 to mounting device 10. As is apparent, a user can easily snap phone 12 into firm engagement with device 10 using a single hand by simply inserting extension 70 into slot 38 and thereafter rotating the phone upwardly until it "snaps" into place. In this mounted position, a user has complete access to display 58 and keypad 60.

In order to remove phone 12, a user places his/her thumb on one of the finger-engaging areas 52 and another finger on the other finger-engaging area 52. Thereafter, the user applies a squeezing pressure utilizing his/her thumb and the other finger inwardly toward the interior of base 14 such that detents 46 rotate outwardly to disengaged positions with respect to slots 74. As this is done, curved camming surface 48 of each arm 40 engages curved areas 68 of case 58 to force the phone 12 outwardly away from base 14, as indicated by the arrows in FIG. 10. Phone 12 is still hingedly connected to base 14 via extension 70 and slot 38. However, the squeezing action on areas 52 results essentially in simultaneous disengagement of detents 46 from slots 74 and the forcing outwardly of the upper portion of phone 12 via the engagements of camming surfaces 48 and curved areas 68 of case 56. In essence, phone 12 has the feel of "popping" or "ejecting" out of base 12. In order for the user to completely disengage phone 12 from device 10, the user simply lifts slightly upwardly on the phone until extension 70 disengages from slot 38. Thereafter, the phone rests in user's hands and can be easily operated by the user. As best shown in FIGS. 4 and 9, the outwardly "ejecting" action is accomplished because offset section 50 of inner surface 44 of arms 40 does not engage side members 64 of case 56. This allows deformation or torsion of members 42 to allow the detents 46 to disengage, and camming surfaces 48 to act on curved area 68 to force phone 12 outwardly.

Device 10 offers numerous advantages over prior art structures. In particular, the structure provides for one-handed attachment by a user simply by "snapping" the phone into place without the need to manipulate any movable levers or gripping members. Additionally, to remove the phone from the mount, a user simply squeezes on two different engaging surfaces with his/her hand in an ergonomical position and the phone "ejects" right into the user's hands. Still further, because of the simple nature of device 10 and the use of torsion members 42, device 10 can be molded of a single piece plastic construction and does not require assembly of minute pivoting parts and other spring and ratchet mechanisms. The device 10 provides an easy and effective way to firmly mount a phone 12 to a support surface such that the phone can be easily accessed by the user.

From the foregoing, it will be seen that this invention is one well-adapted to attain all the ends and objects hereinabove set forth, together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

I claim:

1. A holding device for removably attaching a hand-held electronic instrument to a support surface, said holding device comprising:

a base adapted to be attached to the support surface, said base having a front surface, whereby the front surface engages the hand-held instrument when the instrument is positioned in the base; and a pair of locking arms attached to said base at laterally spaced locations, each arm extending generally outwardly from said front surface and having a detent and a finger-engaging area associated therewith, whereby said detents engage the hand-held instrument to attach the instrument to said base when the instrument is positioned in the base, wherein said detents are biased toward the interior of said base;

wherein said arms have a first position whereby said detents engage the instrument, and wherein said arms have a second position, whereby said detents are disengaged from said instrument by an operator actuating said finger-engaging areas, wherein said second position is attained by an operator squeezing the finger-engaging areas toward one another.

2. The holding device of claim of 1 wherein said arms are at opposed locations on opposite side edges of said base.

3. The holding device of claim 1 wherein said finger-engaging areas extend generally perpendicular to said front surface and said detents move in a plane that extends generally parallel to said front surface.

4. The holding device of claim 1 further including a receiving slot formed adjacent a lower end of said base, said slot adapted to receive a projection extending from a lower end of the instrument.

5. The holding device of claim 4 further including a pair of lips extending outwardly from said base front surface on opposite sides of said base, said lips adapted for generally engaging side surfaces of the instrument.

6. The holding device of claim 5 wherein said slot is generally formed by a pair of extensions extending inwardly from said lips.

7. A holding device for removably attaching a hand-held electronic instrument to a support surface, the combination of said holding device and said hand-held electronic instrument comprising:

a base adapted to be attached to the support surface, said base having a front surface adapted to engage the instrument and a receiving slot formed adjacent a lower end of said base adapted to engage a projection on the instrument; and a pair of detents attached to said base at spaced lateral locations, said detents having a first position adapted to engage the instrument to lock the instrument to said base, said detents movable to a second position wherein said detents are disengaged from the instrument;

a pair of camming members attached to said base at spaced lateral locations, said camming members adapted to engage the instrument to force the instrument away from said base when said detents are moved to their second positions.

8. A holding device for removably attaching a hand-held electronic instrument to a support surface, said holding device comprising:

a base adapted to be attached to the support surface, said base having a front surface, whereby the front surface engages the hand-held instrument when the instrument is positioned in the base; and a pair of locking arms attached to said base at laterally spaced locations, each arm extending generally outwardly from said front surface and having a detent and a finger-engaging area associated therewith, whereby said detents engage the hand-held instrument to attach the instrument to said base when the instrument is positioned in the base;

wherein said arms have a first position whereby said detents engage the instrument, and wherein said arms have a second position, whereby said detents are disengaged from said instrument by an operator actuating said finger-engaging areas, and wherein each arm has a camming surface located adjacent said finger-engaging area, and wherein said camming surfaces are adapted to engage a back portion of the instrument when said finger-engaging areas are actuated to force the instrument away from said base.

9. A holding device for removably attaching a hand-held electronic instrument to a support surface, said holding device comprising:

a base adapted to be attached to the support surface, said base having a front surface, whereby the front surface engages the hand-held instrument when the instrument is positioned in the base; and a pair of locking arms attached to said base at laterally spaced locations, each arm extending generally outwardly from said front surface and having a detent and a finger-engaging area associated therewith, whereby said detents engage the hand-held instrument to attach the instrument to said base when the instrument is positioned in the base;

wherein said arms have a first position whereby said detents engage the instrument, and wherein said arms have a second position, whereby said detents are disengaged from said instrument by an operator actuating said finger-engaging areas, and wherein each arm has a camming surface located adjacent said finger-engaging area, and wherein each arm is attached to said base through a torsion member positioned at an intermediate location along said arm.

10. A holding device for removably attaching a hand-held electronic instrument to a support surface, said holding device comprising:

a base adapted to be attached to the support surface, said base having a front surface adapted to engage the instrument and a receiving slot formed adjacent a lower end of said base adapted to engage a projection on the instrument; and a pair of detents attached to said base at spaced lateral locations, said detents having a first position adapted to engage the instrument to lock the instrument to said base, said detents movable to a second position, whereby said detents are disengaged from the instrument;

a pair of camming members attached to said base at spaced lateral locations, said camming members adapted to engage the instrument to force the instrument away from said base when said detents are moved to their second positions.

11. The holding device of claim 10 wherein one of said camming members and one of said detents are disposed on an arm torsionally attached to said base.

12. The holding device of claim 11 wherein said arm is torsionally attached to said base through a torsion member attached at an intermediate location of said arm, said detent disposed on one side of said torsion member and said camming surface disposed on the other side of said torsion member.

13. The holding device of claim 12 further including a finger-engaging surface disposed on said arm.

14. The holding device of claim 10 further including a pair of lips extending outwardly from said base on opposite sides of said base, said lips adapted for generally engaging side members of the instrument.

15. The holding device of claim 14 wherein said slot is generally formed by a pair of extensions extending inwardly from said lips.

16. A method of mounting a hand-held electronic instrument to a support surface, the method comprising:

mounting a base to the support surface, said base having a pair of laterally spaced detents and a receiving slot disposed adjacent a lower end of said base;

inserting a projection formed on the bottom of the instrument into the slot with the instrument at an angle to the base;

rotating the instrument toward the base with the projection in the slot; and snapping the detents into apertures formed on the instrument to secure the instrument to the base.

17. A holding device for removably attaching a hand-held electronic instrument to a support surface, the combination of said holding device and said hand-held electronic instrument comprising:

a base adapted to be attached to the support surface, said base having a front surface for engaging the hand-held instrument; and a pair of locking arms attached to said base at laterally spaced locations, each arm extending generally outwardly from said front surface and having a detent and a finger-engaging area associated therewith, said detents adapted to engage the hand-held instrument to attach the instrument to said base;

wherein said arms have a first position wherein said detents engage the instrument, and wherein said arms have a second position wherein said detents are disengaged from said instrument by an operator actuating said finger-engaging areas.

* * * * *